United States Patent [19]

Solomon

[11] Patent Number: 4,998,558
[45] Date of Patent: Mar. 12, 1991

[54] SOLAR WATER HEATING SYSTEM

[76] Inventor: Fred D. Solomon, 979 Meadow Park Dr., Akron, Ohio 44313

[21] Appl. No.: 475,292

[22] Filed: Feb. 5, 1990

Related U.S. Application Data

[62] Division of Ser. No. 234,511, Aug. 22, 1988, Pat. No. 4,917,079.

[51] Int. Cl.$^5$ ............................................ F16K 31/363
[52] U.S. Cl. ................................. 137/510; 137/625.37
[58] Field of Search ..................... 137/509, 510, 625.3, 137/625.37

[56] References Cited

U.S. PATENT DOCUMENTS

| | | | |
|---|---|---|---|
| 3,236,261 | 2/1966 | Morgan | 137/510 X |
| 3,428,086 | 2/1969 | Glasgow | 137/625.3 |
| 3,783,848 | 1/1974 | Ranft et al. | 137/510 X |
| 3,791,413 | 2/1974 | Muller et al. | 137/625.3 |
| 4,763,688 | 8/1988 | Morris | 137/509 |

FOREIGN PATENT DOCUMENTS

| | | | |
|---|---|---|---|
| 1222473 | 6/1960 | France | 137/509 |
| 559788 | 3/1944 | United Kingdom | 137/509 |

Primary Examiner—Stephen M. Hepperle
Attorney, Agent, or Firm—Renner, Kenner, Greive, Bobak, Taylor & Weber

[57] ABSTRACT

A solar powered water heating system including an atmospherically sealed regulating valve (40) initially opening to pass fluid at a minimum selected pressure and remaining open to pass fluid until the fluid pressure reaches a selected reduced pressure including a housing (41), a valve housing cap (42) enclosing the open end of the housing, a valve element (60) movable axially of the housing, a first chamber (47) in the housing axially of the valve element in one direction, a second chamber (58) in the housing axially of the valve element in the other direction, a bore (70, 83) extending through the valve element connecting the first chamber and the second chamber, a fluid inlet passage (45) supplying fluid to the first and second chambers, a third chamber (51) in the housing communicating with fluid outlet passages, and a biasing element (85) permitting movement of the valve element for fluid communication between the first chamber and the third chamber at the minimum selected pressure in the fluid inlet passage and effecting movement of the valve element for interrupting fluid communication between the first chamber and the third chamber at the selected reduced pressure.

7 Claims, 3 Drawing Sheets though an interconnecting conduit and into a pump constitutes a sufficient volumetric expansion such that the pressure of the working fluid reduces to an extent sufficient to convert all or part of the working fluid to a liquid state such that the pump is incapable of commencing operation to institute the circulation required for the system to perform.

SOLAR WATER HEATING SYSTEM

This application is a division of application Ser. No. 07/234,511, filed Aug. 22, 1988, now U.S. Pat. No. 4,917,079.

TECHNICAL FIELD

The present invention relates generally to a solar water heating system for supplying a commercial or domestic hot water system or supplementing a conventional hot water heater in supplying such a hot water system. More particularly, the present invention relates to a solar hot water heating system in which a refrigerant circulated through a solar collector operates in a thermodynamic cycle to transfer solar energy to water to heat it. More particularly, the present invention relates to a hot water system wherein a refrigerant is circulated through a solar collector employed as part of a thermodynamic cycle to transfer heat to produce hot water and to operate a pump to circulate the refrigerant in the system.

BACKGROUND ART

Since the major escalations in the cost of conventional fuels such as oil, coal and natural gas, along with diminishing worldwide reserves of these fuels, increasing attention has been directed to developing alternative energy sources. Solar radiation is an energy source which has long been recognized as a readily available alternative, particularly in certain geographic areas of the world. While solar energy has been demonstrated to be adaptable for some heating purposes, it has been relatively difficult and expensive to achieve adequate performance in other applications in widely varying geographic areas.

Solar energy has been successfully employed to serve an auxiliary heating function such as for swimming pools in warmer climates having a relatively high percentage of sunshine during the year. In most instances the swimming pool water is passed through the solar collectors with the warmed water being returned and recirculated through the swimming pool. These installations typically employ electrically driven pumps for circulating the water. In addition, elaborate control systems are employed to selectively circulate pool water to and from the solar collectors and to shut down the system during under or over heating conditions.

Solar collectors have also been used to heat water in water heater applications of varying sizes and configurations. In a manner similar to the swimming pool applications, the systems characteristically circulate the water to be heated through the solar collectors as effected by an electric pump and numerous related control elements.

To the extent efforts may have been made to create a truly efficient system by employing a solar pump in a water heating system, a problem is encountered in the introduction of vaporized fluid to a solar pump during start-up operations. Such start-up operations occur each morning and in instances of extreme overcast where a solar collector becomes inoperative for purposes of converting a working fluid from a liquid state to a gaseous state. During a typical start-up situation there is normally marginally increasing solar energy available so that working fluid is converted to a gaseous state at a relatively slow but perhaps increasing rate. The introduction of minimal quantities of gaseous working fluid through an interconnecting conduit and into a pump constitutes a sufficient volumetric expansion such that the pressure of the working fluid reduces to an extent sufficient to convert all or part of the working fluid to a liquid state such that the pump is incapable of commencing operation to institute the circulation required for the system to perform.

If a valve is employed which requires fluid to reach a sufficient pressure prior to introduction to the pump, the system may nevertheless be incapable of self-starting. This is brought about as a result of the fact that the working fluid upon opening of the valve may be reduced by expansion of the working fluid into the pump and the supply line therefor such that the valve promptly recloses. Upon sufficient build-up of pressure from the solar collector fluid, the valve may again cycle open but fluid introduced to the pump has in the meantime condensed to a liquid state. Thus a cyclic opening and closing of a valve may take place without instituting continuing operation of the pump.

Another problem encountered in the operation of systems for the above applications resides in the use of water as the heat transfer medium passing through the solar collector. In freezing conditions which can take place in many geographic areas at nighttime, the water in the collectors may freeze and seriously damage or destroy the solar collector elements. As a result additional controls and equipment are often incorporated which provide for the drain down of water from the solar collectors when the outdoor temperature drops below a preselected value which could result in the freezing of water contained in a solar collector array. While numerous systems of the above type have been employed in the described applications, elaborate controls and the attendant maintenance have normally characterized these configurations, thereby generally relegating them to auxiliary usage in conjunction with elaborate and expensive water heating and conditioning systems.

DISCLOSURE OF THE INVENTION

Therefore, an object of the present invention is to provide a water heating system wherein the heat transfer fluid is also employed as the working fluid for operating a pump to circulate the heat transfer fluid. Another object of the present invention is to provide such a water heating system wherein the heat transfer fluid is a refrigerant. Yet another object of the present invention is to provide such a water heating system wherein the refrigerant goes through a vapor cycle wherein it is converted from a liquid state to a gaseous state in a solar collector and from a gaseous state to a liquid state to operate a system pump and to heat water in a heat exchanger.

Another object of the present invention is to provide a water heating system wherein the working fluid is a refrigerant which is not subject to freezing and, therefore, obviates the possibility of damage or destruction of the solar collector elements, without the presence of drain down or other fluid evacuation devices for the collector elements. Still another object of the present invention is to provide such a water heating system which does not require the use of electrical power for the actuation of any components thereof. Still a further object of the present invention is to provide such a water heating system which does not require a control system that may be subject to failure and wherein the system is essentially self-regulating.

Another object of the present invention is to provide a water heating system having a regulating valve which supplies working fluid to the pump only when the working fluid in the solar collector has achieved a predetermined pressure sufficient for operation of the pump. Yet a further object of the present invention is to provide a regulating valve which opens and supplies fluid to the pump only when the working fluid in the solar collector has achieved a predetermined pressure and which will not close to interrupt the supply of working fluid unless and until the pressure of the working fluid diminishes to a selected substantially reduced pressure. Yet another object of the present invention is to provide such a water heating system wherein the working fluid exiting the pump is transferred to a heat exchanger to be employed for heating water. Another object of the present invention is to provide such a water heating system wherein a portion of the working fluid being transferred from the solar collector to the pump is diverted directly to a heat exchanger heating the water when the working fluid exiting the solar collector achieves a predetermined pressure.

Still another object of the present invention is to provide a water heating system which may serve as a part-time water heating system depending upon the availability of solar energy or may be operated as an adjunct to a conventional gas or electric hot water heater. A still further object of the present invention is to provide such a water heating system wherein attachment for interconnection with a standard hot water tank may be quickly and easily effected. Yet another object of the present invention is to provide such a water heating system wherein all components of the system except for the solar collectors may be remotely positioned in a conditioned environment. Yet a further object of the present invention is to provide such a water heating system which employs proven operating components known to normally have a long service life.

In general, a solar powered water heating system for heating water in a storage tank according to the concepts of the present invention has a solar collector for converting a refrigerant from a liquid to a gaseous state, a pump communicating with the solar collector via a first refrigerant supply line and operable by the gaseous state of the refrigerant, a heat exchanger communicating with and receiving refrigerant from the pump, the heat exchanger transferring heat from the refrigerant to water passing therethrough from the storage tank, and lines supplying condensed refrigerant in the heat exchanger to the pump for return circulation to the solar collector. The system additionally has an atmospherically sealed regulating valve initially opening to pass fluid at a minimum selected pressure and remaining open to pass fluid until the fluid pressure reaches a selected reduced pressure including a housing, a valve housing cap enclosing the open end of the housing, a valve element movable axially of the housing, a first chamber in the housing axially of the valve element in one direction, a second chamber in the housing axially of the valve element in the other direction, a bore extending through the valve element connecting the first chamber and the second chamber, a fluid inlet passage supplying fluid to the first and second chambers, a third chamber in the housing communicating with fluid outlet passages, and a biasing element permitting movement of the valve element for fluid communication between the first and second chambers and the third chamber at the minimum selected pressure in the fluid inlet passage and effecting movement of the valve element for interrupting fluid communication between the first and second chambers and the third chamber at the selected reduced pressure.

PREFERRED EMBODIMENT FOR CARRYING OUT THE INVENTION

Figure 1:
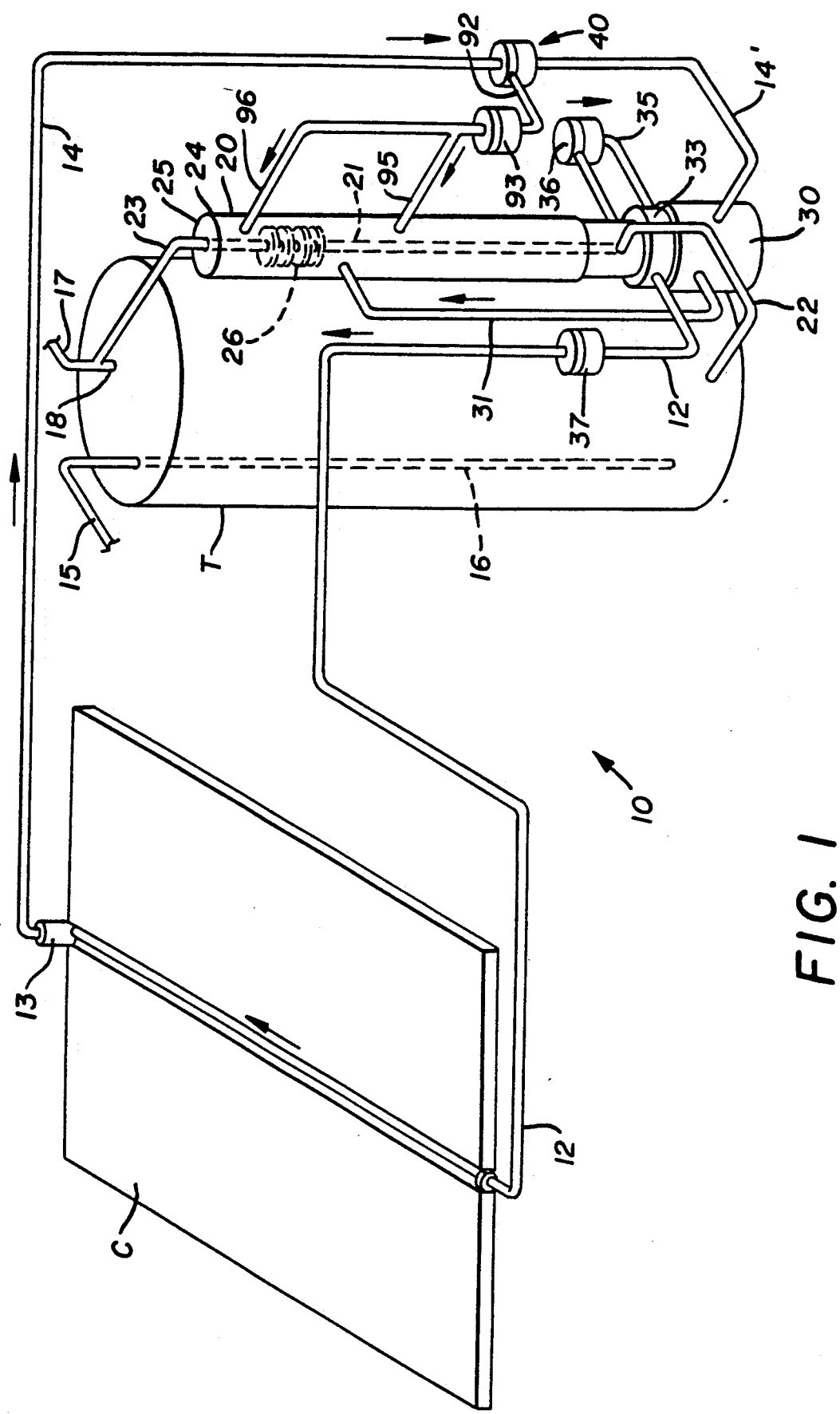
FIG. 1 is a perspective view of a solar water heating system embodying the concepts of the present invention including a solar collector, tank, pump, heat exchanger, and related and interconnecting components, with some components being schematically depicted.

An exemplary solar water heating system embodying the concepts of the present invention is denoted by the numeral 10 in FIG. 1 of the accompanying drawings. The water heating system 10 has as the primary power source component a solar collector C which is placed in an outdoor location which has an appropriate incidence of the sun's rays based upon geographic and other factors. The solar collector C may be constituted of one or more arrays having suitable interconnecting pipes in order to provide sufficient heating capacity for the particular water heating system 10 taking into account factors which will be appreciated by persons skilled in the art including the geographic location of the collector C, the number and size of each collector array and the efficiency characteristics of a particular design.

The solar collector C is supplied with working fluid by a fluid inlet line 12 which supplies working fluid, in this case preferably a refrigerant such as Freon, to the collector C via a separator 13 which separates incoming liquid from working fluid which has vaporized in the solar collector C by virtue of the absorption of heat and which exits from the separator 13 by way of a fluid outlet line 14. The use of a refrigerant as the working fluid is advantageous in that it will not freeze and possibly damage the solar collector C and therefore the system need not be provided with a drain down mechanism or the like. While various refrigerants might be employed, a refrigerant having a boiling point in the range of the desired operating temperature of the hot water has been successfully employed.

Figure 2:
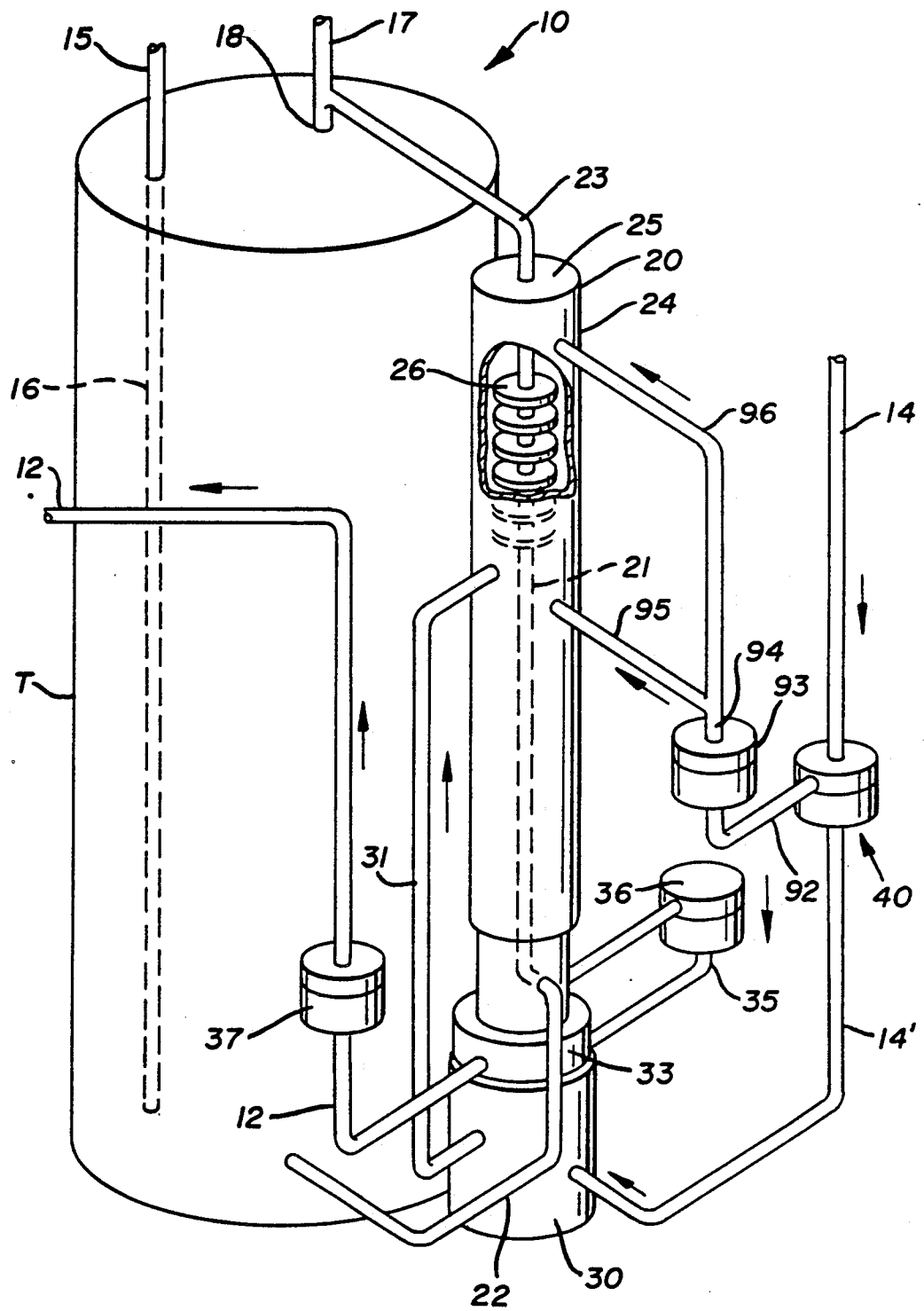
FIG. 2 is an enlarged perspective view showing particularly the tank, pump, heat exchanger and interconnecting components of the water heater system of FIG. 1.

Referring now to both FIGS. 1 and 2 of the drawings, the fluid inlet line 12 and fluid outlet line 14 effect necessary horizontal and vertical travel which will be minimized to the extent possible with respect to each installation and terminate proximate to a fluid storage tank T which is normally located in a protected environment and in colder geographic locations preferably in a heated space. The fluid storage tank T may be a container having the characteristics of a standard hot water tank in having a cold water inlet pipe 15 which is connected to the water supply system of a house or business facility and which may include a downpipe 16 terminating proximate the bottom of the tank T. The tank T may, of course, be the standard cylindrical configuration commonly employed in both residential and commercial applications.

The tank T also has a hot water outlet pipe 17 which preferably terminates at an end 18 which is located proximate the upper vertical extremity of the hot water tank T. Upon demand from usage in a hot water system, hot water exits through the hot water outlet pipe 17 while cold water simultaneously enters through the inlet pipe 15 to thereby replenish the water level in the storage tank T so that the end 18 of water outlet pipe 17 remains immersed in water in the tank T at all times. It should also be appreciated that the water outlet line 17 may be attached downstream to a standard hot water heater which is then, in turn, connected to a domestic or commercial water delivery system. In this manner the standard hot water tank may provide supplemental as or electrical energy to impart supplemental heat to the water when necessary at night or during overcast days when the solar collector C is inoperative or is operating at substantially reduced efficiency, respectively.

Interconnected with and preferably physically proximate to the tank T is a heat exchanger 20. The heat exchanger 20 is preferably of an elongate design with the longitudinal dimension extending vertically of the tank T and advantageously a substantial portion of the height thereof. As shown, the heat exchanger has a core tube 21 extending a substantial portion of the height of the tank T. The core tube 21 has connected at its lower end an exchanger inlet tube 22 which communicates with the tank T proximate the bottom thereof. Connected to the upper end of the core tube 21 is an exchanger outlet tube 23 which communicates with the tank T proximate the upper end thereof. As shown, the exchanger outlet tube 23 interconnects with the water outlet line 17 proximate the end 18 thereof. It will thus be appreciated that the water in tank T will stratify due to gravity with the hottest water at the top of the tank, the coldest water at the bottom of the tank and with intermediate temperature gradients dispersed therebetween. With the core tube 21 interconnected with the tank T as described above, the water in core tube 21, as an integral body of water with that in tank T, will stratify in an identical manner along the length of the core tube 21.

The heat exchanger 20 has an external sleeve 24 which encases the core tube 21 forming an annular cavity thereabout which is closed at the axial extremities by end plates 25. It is to be appreciated that the sleeve 24 may possess suitable insulation to facilitate the maintenance of the temperature of a heating fluid to be supplied in the annular chamber surrounding core tube 21. The core tube 21 may possess fins 26 or other design features known to persons skilled in the art to facilitate the transfer of heat from fluid in the chamber to the water in the core tube 21, respectively.

In fluidic interconnection and physically preferably proximate to the heat exchanger 20 is a solar powered pump 30. The pump 30 may advantageously be of the type disclosed in my earlier U.S. Pat. No. 4,666,376 issued May 19, 1987 for "Solar Powered Pump Assembly". Vaporized fluid produced in solar collector C is supplied to the pump 30 via the fluid outlet line 14 and 14'. The fluid outlet line 14' constitutes the high pressure input to the expansion chamber in the pump 30. A pump vent conduit 31 connects with the vent port of the pump and transfers working fluid from the expansion chamber of pump 30 which is at a reduced temperature and pressure to the heat exchanger 20. In particular, the pump vent conduit 31 extends through the sleeve 24 and communicates with the annular cavity formed about the core tube 21 and within the sleeve 24. In this manner heating fluid is supplied to the annular chamber surrounding core tube 21 to effect transfer of heat from the fluid vented from the pump 30 to the water in the core tube 21.

As the fluid supplied to the annular chamber of heat exchanger 20 is cooled by the absorption of heat by the water in the core tube 21, it condenses at the bottom of the annular chamber of heat exchanger 20. A condensate outlet tube 35 drains the condensed working fluid to the pump head 33 from which the condensed working fluid is pumped during movement of the pump plunger in the pump head 33. The condensate outlet tube 35 is provided with a check valve 36 which normally permits free flow of liquid condensate from heat exchanger 20 to pump head 33 but prevents reverse flow of condensate in condensate outlet tube 35 when the pump plunger cycles through its working stroke. Working fluid condensate which is forced out of pump head 33 during the working stroke of the pump is returned to the collector C by way of the fluid inlet line 12 which introduces liquid working fluid to the collector C by way of the separator 13 normally located in the upper reaches of collector C. In order to prevent condensed working fluid from draining back into the pump head 33 during the return stroke of the pump piston the fluid inlet line 12 is provided, preferably proximate to pump head 33, with a check valve 37 which permits the condensed working fluid to flow through valve 37 only in the direction from the pump head 33 to the collector C.

Interposed in the fluid outlet line 14 is a regulating valve, generally indicated by the numeral 40. The regulating valve 40 is a unique configuration which enables the solar water heating system 10 to be self-starting or capable of commencing system operation after time periods when the system 10 is inoperative due to an absence of sufficient solar heating such as night or overcast sky conditions. The problem normally encountered is that solar pump 30 is capable of instituting operation of the system only when vaporized working fluid is continuously introduced at significant pressures over a significant time period depending upon characteristics of the pump 30. In instances where only small quantities of vaporized working fluid are intermittently introduced, the working fluid may condense in the pump expansion chamber such that the pump does not become operative. These conditions intensify in instances where the distance between the pump 30 and the collectors becomes increasingly large as in instances of collectors being located at the top of multi-story structures or where significant horizontal displacement between the tank T and the collector C is necessitated for some reason.

Figure 3:
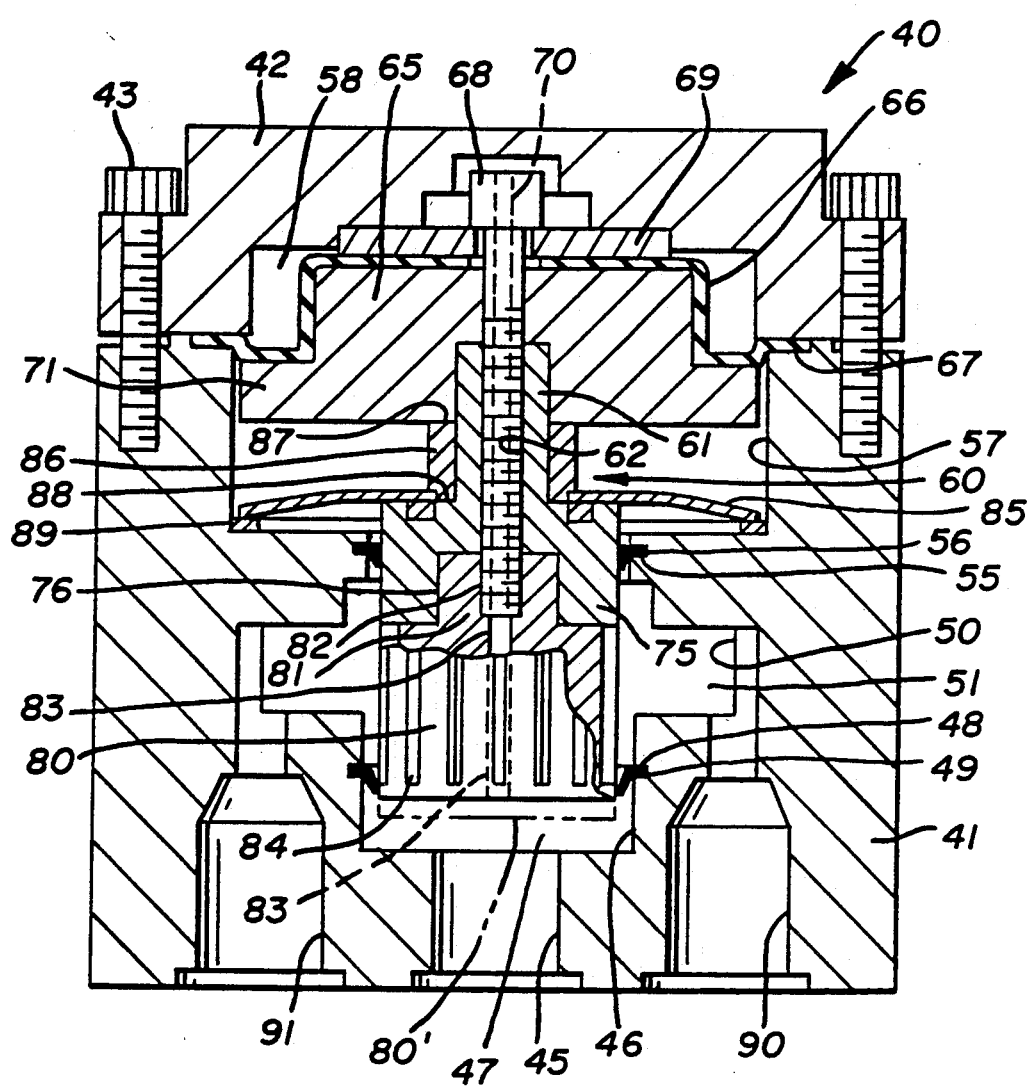
FIG. 3 is a sectional view with portions broken away of a regulating valve with internal diverter which controls the availability of refrigerant gas to flow from the solar collector to the pump and the heat exchanger.

The regulating valve 40, in the preferred embodiment shown in detail in FIG. 3 is an atmospherically sealed unit. As seen, the regulating valve 40 has a cup-shaped housing 41 which may be generally cylindrical. The cup-shaped housing 41 has removably positioned at the open end thereof a cap 42 which is adapted for effecting closure of the housing 41. The cap 42 may be selectively attached to the housing 41 as by a plurality of machine screws 43 circumferentially spaced about the housing 41. The cap 42 may be selectively removed by removing machine screws 43 for purposes of servicing or replacing elements of regulating valve 40 internally of the housing 41.

The housing 41 is interiorly hollow as defined in part by a fluid inlet passage 45. The fluid inlet passage 5 may be cylindrical and provided with a suitable fitting (not shown) to effect fluid-tight interconnection with the fluid outlet line 14 from the solar collector C depicted in FIGS. 1 and 2 of the drawings. The hollow interior of housing 41 is further defined by a cylindrical wall 46 forming a fluid inlet chamber 47 which is adjacent to and of a slightly greater diameter than the fluid inlet passage 45. A portion of the fluid inlet chamber 47 is provided with a circumferential slot 48 which is adapted to receive a sealing ring 49. The O-ring 49 functions in a manner hereinafter described. Positioned axially of the fluid inlet chamber 47 and forming a further portion of the hollow interior of housing 41 is an enlarged cylindrical channel 50. The enlarged channel 50 constitutes a fluid outlet chamber 51.

Positioned axially to the other side of outlet chamber 51 relative to the O-ring 49 and its related circumferential slot 48 is a comparable circumferential slot 55 which seats an 0-ring 56. Constituting a further portion of the hollow interior of housing 41 is a circular recess 57 which constitutes a spring seat in a manner hereinafter described. The area of the hollow interior of housing 41 proximate to the cap 42 is a pressure balancing chamber 58 which functions as hereinafter described.

Interposed within the housing 41 of regulating valve 40 is a valve element, generally indicated by the numeral 60, which is a somewhat cylindrical member that has portions of differing outside diameter and is adapted to be positioned and movable within the hollow interior of housing 1. The valve element 60 has an elongate cylindrical body 1 extending from fluid inlet chamber 47 to pressure balancing chamber 58. The cylindrical body 61 has a through bore 2 extending from one axial extremity to the other axial extremity.

The valve body 61 terminates at one axial extremity with an enlarged head 65 which is movable in the pressure balancing chamber 58 in the area proximate cap 42 of housing 41. In order that the pressure balancing chamber 58 may be a sealed compartment of a size dependent upon the axial position of the valve element 60, the head 65 may carry at its axial extremity an attached diaphragm 66. The entire circular periphery 67 of diaphragm 66 is sealingly engaged to the hollow interior of housing 41 and may be conveniently interposed between the joined axial extremities of housing 41 and cap 42. The diaphragm 66 is attached to valve body 61 as by a machine screw 68 located centrally of head 65 of piston 56. A plate 69 may be located between the head 65 of piston 56 and machine screw 68 to maintain diaphragm 66 in contact with the head 65. The machine screw 68 has a bore 70 which provides pressure equalization between the pressure balancing chamber 58 where the head of machine screw 68 is located and fluid inlet chamber 47, the latter as hereinafter described. The axial extremity of head 65 opposite machine screw 68 has a radially enlarged cylindrical piston 71 which interfits with recess 57 to guidingly maintain valve element 60 aligned during its movement.

The axial extremity of valve body 61 opposite the head 65 has an enlarged guide section 75 which is adapted to move within fluid inlet chamber 47 above the enlarged channel 50 and in contact with the 0-ring 56 to maintain fluid separation between the fluid outlet chamber 51 and the portion of valve housing 41 above 0-ring 56. The lower axial extremity of enlarged guide section 75 has an axial bore 76 which is adapted to receive a portion of a spool 80. The spool 80 has a cylindrical projection 81 which interfits within the axial bore 76 in enlarged guide section 75 such as to maintain the enlarged guide section 75 and spool 80 in alignment. The spool 80 has a threaded bore 82 which is adapted to receive and selectively threadably engage the machine screw 68. It will thus be appreciated that machine screw 68 selectively joins the cylindrical body 61 of valve element 60, the enlarged head 65 and the spool 80. The spool 80 has a bore 83 preferably disposed centrally thereof and communicating with the bore 70 located internally of machine screw 68. Thus, the bores 70 and 83 provide continual fluid communication between the inlet chamber 47 and the balancing chamber 58. The outer surface of the spool 80 is continually engaged by the sealing ring 49 in fluid-tight relationship.

Commencing a distance spaced from the axial extremity of spool 80 opposite the guide section 75 the spool 80 has a plurality of circumferentially spaced longitudinal slots 84 on the outer surface thereof. The slots 84 have their axial extent selected so that they extend a distance above the sealing ring 49 but less than the axial distance between the rings 49 and 56 and are positioned so that they are located entirely above sealing ring 49 with spool 80 in the solid line position of FIG. 3 and extend to either side of sealing ring 49 in the chain line position 80′ of spool 80 seen in FIG. 3.

Interposed between the head 65 and the enlarged guide 75 of valve body 61 is a spring washer 85. The spring washer 85 is centrally fixedly positioned along body portion 61 of valve element 60 by means of a sleeve 86 having one axial extremity 87 which engages the head 65 and a second axial extremity 88 which seats the radially inner portion of the spring washer 85 against the enlarged guide 75. As shown, the spring washer 85 is a flexible annular member which is normally slightly bowed and may have its outer periphery seated against a circular ring 89 seated in the valve housing 41.

In operation, when vaporized working fluid from solar collector C is introduced via the fluid outlet line 14 into the fluid inlet passage 45, the valve element 60 resides in the position depicted in FIG. 3 of the drawings. The fluid inlet chamber 47 and the pressure balancing chamber 58 are maintained at the inlet fluid pressure by the bores 70 and 83. The fluid inlet chamber 47 is sealed from the fluid outlet chamber 51 by the sealing ring 49. As the pressure of the working fluid vaporizing in the solar collector C increases and is, transmitted to fluid inlet chamber 47 and pressure balancing chamber 58 the force operating to move the valve element 60 downwardly as viewed in FIG. 3 is increased by virtue of the greater area of the head 65 and diaphragm 66 of the valve element 60. At approximately 18 psi or other preselected pressure, the pressure acting on the head 65 of valve element 60 is sufficient to overcome opposition of spring washer 85 such that spool 80 of valve element 80 moves to the chain line position 60′ depicted in FIG. 3 of the drawings. In thus moving from the closed to the open position the elongate slots 84 of spool 80 move from an axial position where they are contained within the outlet chamber 51 to a position where they reside within both the outlet chamber 51 and the inlet chamber 47. Therefore, the pressurized fluid introduced to fluid inlet chamber 47 is transferred via the slots 84 into the fluid outlet chamber 51.

The valve element 60 remains in this position until such time as the pressure of the working fluid being introduced is reduced to a point that the spring washer 85 moves the valve element 60 back to its original position as depicted in solid lines in FIG. 3 of the drawings with the communication between the fluid inlet chamber 47 and the fluid outlet chamber 51 being thereby discontinued. Due to the fact that the spring washer 85 can maintain the open position at a substantially lesser pressure than that required to move the valve element 60 from the closed to the open position, the spring washer may be configured such that a particular desired pressure reduction must exist before the valve is closed by the spring washer 85. For example, a pressure reduction of approximately 30% may be desired such that, after an opening pressure of 18 psi, a pressure reduction to approximately 12 psi would be required before valve element 60 would close. This permits the regulating valve 40 to avoid cyclic opening and closing which would otherwise prevent successful start-up operation of the solar pump 30 due merely to the minor pressure reduction attendant the initial introduction of working fluid into the fluid outlet chamber 51 and interconnecting elements.

The fluid outlet chamber 51, as seen in FIGS. 1-3, is connected to a pair of fluid outlet passages 90 and 91 in housing 41. One of the fluid outlet passages may be provided with a suitable fitting to effect fluid-tight interconnection with the fluid outlet line 14' which communicates with the pump 30. The other of fluid outlet passages 90, 91 is, via a suitable fitting, connected to a high pressure fluid outlet line 92 which is directed to a check valve 93 connected to an auxiliary refrigerant input line 94 to the heat exchanger 20. As shown, the auxiliary refrigerant input line 92 may have two or more branch input lines 95 and 96 which introduce vaporized refrigerant into the annular area of the heat exchanger 20 between the core tube 21 and the sleeve 24. The check valve 93 is selected, or adapted, as in the example described with respect to regulating valve 40, such as to pass excess quantities of working fluid exceeding the 18 psi pressure required to open regulating valve 40 and operate the solar pump 30. Thus, the high pressure fluid outlet 92 serves to divert excess highly pressurized working fluid only under conditions where the solar collector C is generating an excess of pressurized working fluid at pressures and quantities exceeding that needed to operate the pump 30.

Thus, it should be evident that the solar water heating system disclosed herein carries out the various objects of the invention set forth hereinabove and otherwise constitutes an advantageous contribution to the art. As may be apparent to persons skilled in the art, modifications can be made to the preferred embodiment disclosed herein without departing from the spirit of the invention, the scope of the invention being limited solely by the scope of the attached claims.

I claim:

1. An atmospherically sealed regulating valve initially opening to pass fluid at a minimum selected pressure and remaining open to pass fluid until the fluid pressure reaches a selected reduced pressure comprising, housing means, cap means enclosing the open end of said housing means, valve element means movable axially in said housing means, first chamber means in said housing means axially surrounding one end of said valve element means, second chamber means in said housing means axially surrounding the other end of said valve element means, bore means extending through said valve element means connecting said first chamber means and said second chamber means, fluid inlet passage means supplying fluid to said first and second chamber means, third chamber means in said housing means communicating with fluid outlet passage means, and biasing means permitting movement of said valve element means for fluid communication between said first chamber means and said third chamber means at the minimum selected pressure in said fluid inlet passage means and effecting movement of said valve element means for interrupting fluid communication between said first chamber means and said third chamber means at the selected reduced pressure said biasing means being a spring washer that is a bowed flexible annular member interposed between a circular seat within said housing means and the juncture of a body portion of said valve element means and an enlarged guide section.

2. Apparatus according to claim 1, including diaphragm means attached to said valve element means and said housing means and interposed between said first chamber means and said second chamber means.

3. Apparatus according to claim 1, wherein said circular seat carries a ring against which said spring washer is pivotally engaged.

4. Apparatus according to claim 3, wherein said spring washer assumes a substantially planar configuration upon the compression thereof during movement of said valve element for fluid communication between said first chamber means and said third chamber means.

5. Apparatus according to claim 4, wherein said spring washer means requires a lesser pressure to retain the planar configuration than to effect compression from the bowed to the planar configuration.

6. Apparatus according to claim 1, wherein said housing means has a sealing ring engaging said valve element means disposed between said first chamber means and said third chamber means.

7. Apparatus according to claim 6, wherein said valve element means includes a spool having a plurality of axial slots for transferring fluid from said first chamber means to said third chamber means in the open position.

* * * * *

UNITED STATES PATENT AND TRADEMARK OFFICE
CERTIFICATE OF CORRECTION

PATENT NO. : 4,998,558
DATED : March 12, 1991
INVENTOR(S) : FRED D. SOLOMON

It is certified that error appears in the above-identified patent and that said Letters Patent is hereby corrected as shown below:

```
Column 5, line 14, "as" should read --gas--.

Column 7, line 2, "5" should read --45--.

Column 7, line 32, "1" should read --41--.

Column 7, line 33, "1" should read --61--.

Column 7, line 35, "2" should read --62--.

Column 8, line 58, "overcome opposition" should
read --overcome the opposition--.

Column 8, line 59, "valve element 80" should
read --valve element 60--.

Column 8, line 60, "60'" should read --80'--.
```

Signed and Sealed this

Twenty-first Day of September, 1993

Attest:

BRUCE LEHMAN

*Attesting Officer*  *Commissioner of Patents and Trademarks*